United States Patent [19]

Sugimori et al.

[11] Patent Number: 4,779,133
[45] Date of Patent: Oct. 18, 1988

[54] LOW-NOISE TELEVISION SYSTEM

[75] Inventors: Yoshio Sugimori; Yoshihide Kimata, both of Tokyo; Yosai Araki, Tokorozawa, all of Japan

[73] Assignee: Nippon Television Network Corporation, Tokyo, Japan

[21] Appl. No.: 109,066

[22] Filed: Oct. 16, 1987

[30] Foreign Application Priority Data

Oct. 23, 1986 [JP] Japan .................................. 61-253481
Mar. 6, 1987 [JP] Japan .................................... 62-52626

[51] Int. Cl.⁴ ............................................. H04N 5/213
[52] U.S. Cl. ....................................... 358/167; 358/36; 358/340
[58] Field of Search ................. 358/167, 166, 160, 36, 358/37, 39; 358/340, 315

[56] References Cited

U.S. PATENT DOCUMENTS

| | | | |
|---|---|---|---|
| 3,333,055 | 7/1967 | Krause | 358/167 |
| 4,096,513 | 6/1978 | Ross | 358/315 |
| 4,281,346 | 7/1981 | Strobele | 358/160 |
| 4,385,326 | 5/1983 | Amery et al. | 358/39 X |
| 4,563,704 | 1/1986 | Hirota | 358/167 |
| 4,607,285 | 8/1986 | Hirota et al. | 358/36 X |
| 4,618,893 | 10/1986 | Hirota et al. | 358/167 |
| 4,658,305 | 4/1987 | Tsushima | 358/167 X |
| 4,682,251 | 7/1987 | Hirota et al. | 358/167 |

FOREIGN PATENT DOCUMENTS 60-117984 6/1985 Japan ...................................... 358/37

Primary Examiner—James J. Groody
Assistant Examiner—E. Anne Favis
Attorney, Agent, or Firm—Morris Fidelman; Franklin D. Wolffe

[57] ABSTRACT

A low-noise televison system having means for suppressing increased noise without reduction of improved picture quality. In the television broadcast transmitter, a television video signal is separated into luminance and chrominance signals and the luminance signal is further separated into high and low frequency components. The high frequency component is pre-emphasized in a specific emphasis characteristic relating to the amplitude of the low frequency component and the pre-emphasized high frequency component is then combined with the low frequency component and further matrixed with the chrominance signal to recover the video signal to be transmitted. In the television receiver, the received video signal is separated into luminance and chrominance signals and the luminance signal is further separated into high and low frequency components in similar fashion to the transmitter. The high frequency component is de-emphasized in a characteristic opposite of emphasis characteristic of the transmitter in accordance with the amplitude of the low frequency component and the de-emphasized high frequency component is then combined with the low frequency component and further matrixed with the chrominance signal to recover the video signal to be displayed.

1 Claim, 2 Drawing Sheets

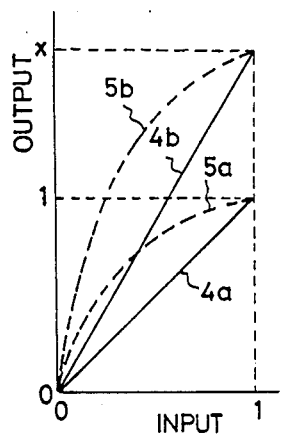
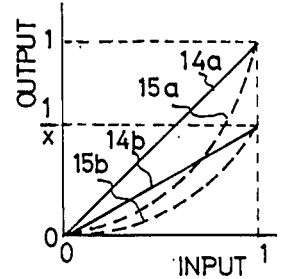
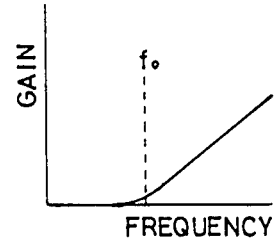
FIG. 7      FIG. 8      FIG. 11
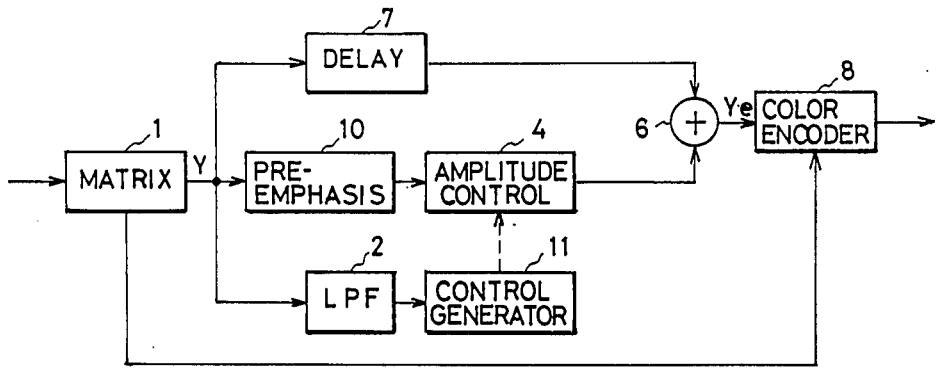
FIG. 9
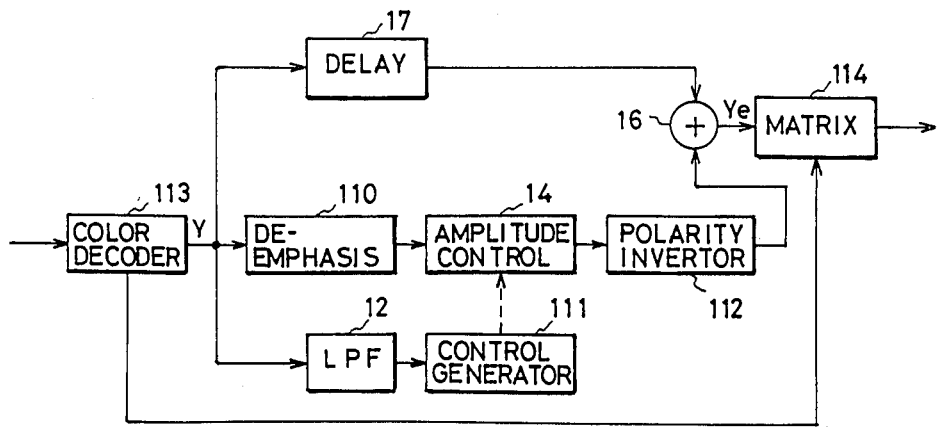
FIG. 10

LOW-NOISE TELEVISION SYSTEM

BACKGROUND OF THE INVENTION

This invention relates to a low-noise television system having means for suppressing increase of noise as maintaining improved picture quality in television broadcast transmission and reception.

As described, for example, in the report of Sudo et al, "Technology for High-Picture Quality of Color TV Receiver", Toshiba Review, Vol. 41, No. 6 (1986) pp. 500-503 and the report of Toyoda, "Trend of Color TV Circuit of '86 Type", TV Technique (Terebi Gijutzu), Extra number of Sept. 1986 (No. 420) pp. 21-22, the luminance component of a television signal is transmitted from a broadcasting station in a relatively uniform characteristic up to a range above 4 MHz and a color subcarrier is superimposed therewith at a position of 3.58 MHz. In a modern television receiver, the luminance and chrominance signal components are completely separated by a comb-filter and the luminance signal component is processed in a uniform characteristic in order to avoid undesirable phoenomena, such as cross-color. In such receiver, the bandwidth of luminance signal expands much more than that of the conventional receivers and this results in incease of noise. Therefore, picture quality control function is also provided to make it adjustable for making the noise unnoticeable in some receiving conditions.

As a measure of expanding the usable bandwidth of luminance signal as maintaining the noise suppressed, it is considered to pre-emphasize the luminance signal amplitude in the transmitter and to de-emphasize it in the receiver. However, excessive emphasis for sufficient noise suppression can cause undesirable overmodulation.

SUMMARY OF THE INVENTION

Accordingly, an object of this invention is to provide a television system having means for applying sufficient emphasis to the luminance signal without danger of overmodulation.

According to this invention, a television system is composed of broadcast transmitter and receiver. The transmitter separates the luminance signal component of a color video signal supplied from a camera or the like into a high frequency component and a low frequency component with a predetermined frequency $f_0$ as a borderline therebetween. A desirable value of $f_0$ is about 1 MHz (one megahertz). The high frequency component is pre-emphasized in accordance with a specific emphasis characteristic which is a function of the amplitude of the low frequency component. A desirable emphasis characteristic is given as follows.

$$n = x(1-a)^\gamma + a$$

where n is emphasis rate, x is maximum emphasis value, a is amplitude of low frequency component and $\gamma$ is emphasis factor. As understood from this equation, the emphasis rate n becomes the maximum x when the amplitude a of low frequency component is zero and it is reduced to one (1) when the amplitude a is one (1), the maximum. The pre-emphasized high frequency component is combined with the low frequency component and used for preparation of the color video signal for broadcast transmission.

In the receiver, the luminance signal component of the received color video signal is separated into a high frequency component and a low frequency component with the above-mentioned frequency $f_0$ as a borderline therebetween. The high frequency component is de-emphasized in accordance with the amplitude a of the low frequency component in an emphasis characteristic which is opposite to that of the transmitter and the processed high frequency component is combined with the low frequency component to produce a luminance signal for image display.

In this invention, the low frequency component of the luminance signal is transmitted in its existing amplitude characteristic and displayed by the receiver, while the high frequency component is pre-emphasized in the transmitter and de-emphasized in the receiver for recovering the original amplitude characteristic to be displayed. Therefore, the amplitude characteristic of the luminance signal component provided for display in the receiver is same as the amplitude characteristic of the luminance signal component supplied to the transmitter.

As is obvious from the above-mentioned equation, the pre-emphasis characteristic in the transmitter is a function of the amplitude a of the low frequency component. When the amplitude a of low frequency component is small, the emphasis rate n is large since there is some margin in the degree of modulation and, when the amplitude a becomes one, the maximum, the emphasis rate n is one since there is no margin in the degree of modulation and, in other words, no pre-emphasis is applied. Thus, desired pre-emphasis which is as large as possible is applied with avoidance of over-modulation, thereby suppresing the undesirable noise.

The upper limit of pre-emphasis is determined relying upon compatibility of such broadcast signal received by a conventional receiver which does not accord to this invention. The emphasis rate n exhibits the maximum value x when the amplitude a of low frequency component is zero. As a result of experiment, it has been found that the displayed image on a conventional receiver is rather fine and preferable when pre-emphasis is applied in an emphasis characteristic corresponding to the maximum value x from 1.5 to 2.0, that a satisfactory image can be obtained even by the conventional receiver by effecting soft adjustment of image quality when the maximum value x is 2 to 3 and that the excessive high frequency component becomes conspicuous when the maximum value x exceeds 3. Accordingly, this invention can be put in practice as keeping the compatibility with the conventional receiver by confining the maximum value x of the emphasis rate n below 3.

These and other objects and features of this invention will be described in more detail below with reference to the accompanying drawings.

BRIEF DESCRIPTION OF THE DRAWINGS

In the drawings:

FIG. 7 is a diagram representing an amplitude control characteristic in the transmitter;

FIG. 8 is a diagram representing an amplitude control characteristic in the receiver;

FIG. 9 is a block diagram representing another embodiment of luminance signal processing section in the transmitter;

FIG. 10 is a block diagram representing another embodiment of video signal processing section in the receiver; and FIG. 11 is a diagram representing a control characteristic of a pre-emphasis circuit 10 as shown in FIG. 9.

DESCRIPTION OF PREFERRED EMBODIMENTS

Figure 1:
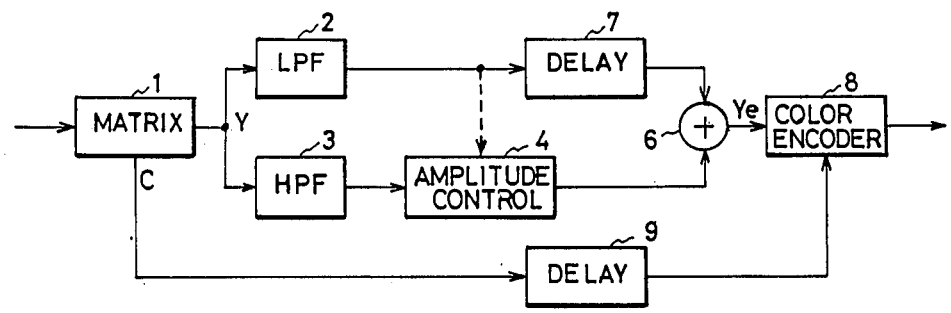
FIG. 1 is a block diagram representing an embodiment of video signal processing section of a television broadcast transmitter according to this invention.

Referring to FIG. 1 representing a video signal processing section of transmitter, an image pickup signal from a color television camera or the like is separated by a matrix circuit 1 into a luminance signal component Y and a chrominance signal component C. The luminance signal component Y is further separated by a low-pass filter 2 and a high-pass filter 3 into a low frequency component and a high frequency component, as shown respectively in FIGS. 4 and 5, with frequency $f_0$ as a borderline therebetween. The borderline frequency $f_0$ is selected to be about one megahertz (1 MHz).

The high frequency component of luminance signal having passed the high-pass filter 3 is emphasized in an amplitude control circuit 4 whose emphasis characteristic is given as follows as described previously.

$$n = x(1-a)^\gamma a$$

Figure 6:
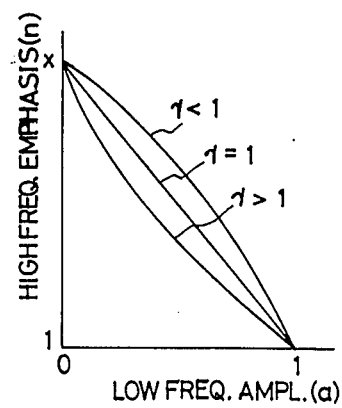
FIG. 6 is a diagram representing a control characteristic of the amplitude control circuit 4 as shown in FIG. 3.

This characteristic is shown in FIG. 6. As shown, the emphasis factor $\gamma$ is selected suitably in the vicinity of one and the equation gives a straight line when $\gamma = 1$, an upwardly convex curve when $\gamma < 1$ and an upwardly concave curve when $\gamma > 1$.

Figure 3:
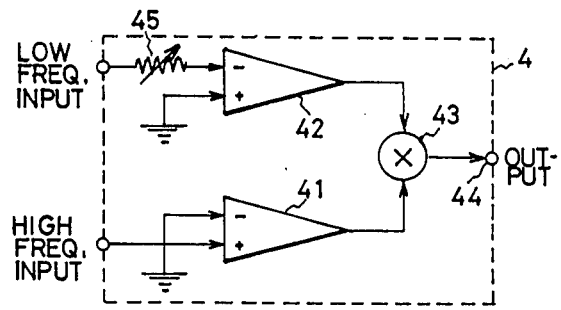
FIG. 3 is a schematic diagram representing an amplitude control circuit 4 as shown in FIG. 1.

In FIG. 3 showing an exemplary arrangement of the amplitude control circuit 4, the high and low frequency components of luminance signal are supplied respectively to differential amplifiers 41 and 42 the amplitude outputs of which are mutually multiplied in a multiplier 43 to appear at an output terminal 44. 45 denotes a variable resistor for changing the signal voltage applied to the amplifier 42 and the maximum value x of emphasis rate n is determined by controlling it. The circuit of FIG. 3 is commercially available, for example, as an integrated circuit of Type MC1495L from Motorola Inc.

As described above, the emphasis rate n of high frequency component in the amplitude control circuit 4 varies over the range from 1 to x with the amplitude a of low frequency component and, therefore, the input-output characteristic of the circuit varies in the range between lines 4a and 4b as shown in FIG. 7.

The high frequency component processed in the amplitude control circuit 4 is combined with the low frequency component in an adder 6 to produce a broadcast luminance signal component Ye. The low frequency component is previously delayed by some length of time in a delay circuit 7 for obtaining phase matching of both signals. The luminance signal component Ye output from the adder 6 is combined with the chrominance signal C in a color encoder 8 which produces a broadcast color television signal. In this case, also, the chrominance signal C is previously delayed by some length of time in a delay circuit 9.

Figure 2:
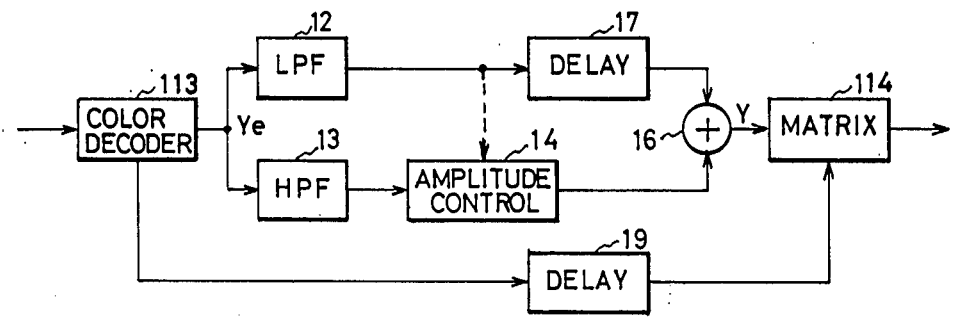
FIG. 2 is a block diagram representing an embodiment of video signal processing section of a television receiver according to this invention.

FIG. 2 shows a video signal processing section of the receiver. A video signal equivalent to the output signal of the color encoder 8 is applied to a color decoder 113 and separated therein into the luminance signal component Ye and the chorminance signal component C. This luminance signal component Ye has been pre-emphasized in the transmitter as described above.

Figure 4:
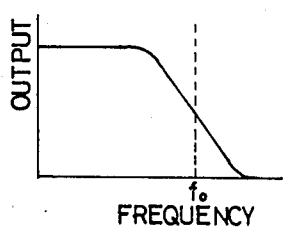
FIG. 4 is a diagram representing a filtering characteristic of a low-pass filter 2 as shown in FIG. 1.
Figure 5:
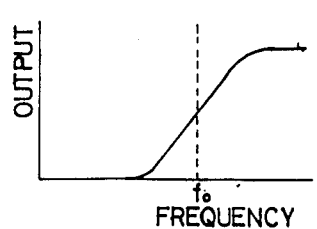
FIG. 5 is a diagram representing a filtering characteristic of a high-pass filter 3 as shown in FIG. 1.

The luminance signal component Ye is separated by a low-pass filter 12 and a high-pass filter 13 into low and high frequency components of the characteristics as shown in FIGS. 4 and 5, respectively. The separated high frequency component is de-emphasized in an amplitude control circuit 14 in accordance with the amplitude a of low frequency component. The characteristic of this circuit 14 must be opposite to that of the amplitude control circuit 4 in the transmitter. Thus, its input-output characteristic is as shown by line 14b of FIG. 8 when the amplitude a of low frequency component is zero, while it is as shown by lines 14a of FIG. 8 when the amplitude of low frequency component is one, the maximum.

The high frequency component processed in the amplitude control circuit 14 is combined with the low frequency component in an adder 16 to provide a luminance signal component Y which is the same shape as the luminance signal component produced by the matrix circuit 1 in the transmitter. The luminance signal component Y is combined in a matrix 114 with the chrominance signal C separated by the color decoder 113 to provide a video signal to be displayed by a kinescope (not shown). Here, delay circuits 17 and 19 disposed in the low frequency component transmission line and the chrominance signal transmission line, respectively, serve to compensate for some signal delay which may occur in the amplitude control circuit 14.

In the above embodiment, effective noise suppression can be effected with avoidance of overmodulation, since the high freqeuncy component of luminance signal is emphasized in response to the marginal degree of modulating determined by the amplitude of low frequency component. Especially, the noise is liable to spoil the view when it appears in the dark area of image since it generally appears in the image in bright form. However, a large amount of de-emphasis is applied to the dark area of image in which the amplitude of low frequency component is small, to highly compress the noise, thereby exhibiting a remarkable visual effect. Moreover, the broadcast signal can be received by a conventional receiver by selecting the maximum value x of preemphasis rate n below 2, and it can be received by a conventinal receiver with no problem by selecting soft adjustment of image quality if the maximum value x is selected in the range from 2 to 3.

FIG. 9 shows a luminance signal processing section in the transmiter according to the second embodiment of this invention. In contrast to the first embodiment, the low-pass filter 2 is removed from the first channel for the luminance signal at the output of matrix 1 and a circuit 10 having a frequency characteristic which suppresses a relatively low frequency output below frequency $f_0$ as shown in FIG. 11 is used in place of the pre-emphasis frequency characteristic circuit composed of a high-passfilter and a amplitude control circuit. Only the amplitude control circuit 4 is controlled by the output of a gain control signal generator circuit 11 and the output luminance signal component from the circuit 4 is added in the adder 6 to the luminance signal Y having passed the delay circuit 7 to provide the aforementioned advantages.

FIG. 10 shows a luminance signal processing section in the receiver. As same as in the transmitter of FIG. 9, the low-pass filter 12 is removed from the first channel and a de-emphasis frequency characteristic circuit 110 having the same characteristic as the pre-emphasis frequency characteristic circuit 10 of the transmitter is used in the second channel. A polarity invertor circuit 112 is inserted between the amplitude control circuit 14 and the adder 16.

Accordingly, the transmitter transits the luminance signal Y processed with a uniform characteristic and added with a specific amount of the high frequency component for pre-emphasis by the circuit 10, which corresponds to the amplitude of the low frequency component, and the receiver produces the high frequency component for de-emphasis which corresponds to the high frequency component for pre-emphasis added by the transmitter in the circuit 110 and subtracts it from the received luminance signal Y. Thus, it is possible to obtain a luminance signal for display having a characteristic close to that of the original luminance signal Y.

As described above, according to this invention, it is possible to obtain effective noise suppression as avoiding overmodulation, thereby obtaining compatibility with the conventional receiver.

What we claim is:

1. A low-noise television system comprising broadcast transmitter and receiver, wherein said transmitter comprises means for separating a luminace signal component into a high frequency component and a low frequency component with a predetermined frequency as a borderline therebetween, preemphasis means for providing said high frequency component in accordance with an amplitude of said low frequency component with a large amount of pre-emphasis when said amplitude of low frequency component is small and with a small amount of pre-emphasis when said amplitude of low frequency component is large, and synthesis means for combining said low frequency component with said pre-emphasis high frequency component to obtain a luminance signal component for broadcast transmission; and said receiver comprises means for separating a received luminance signal component into a high frequency component and a low frequency component with said predetermined frequency as a borderline therebetween, de-emphasis means for processing said high frequency component with a de-emphasis characteristic opposite to said preemphasis means in accordance with said low frequency component, and synthesis means for combining said low frequency component with said de-emphasized high frequency component to obtain a luminance signal component for image display.

* * * * *